May 19, 1925.
M. B. RICHTER
ELECTRIC IMPULSE PRODUCING MECHANISM
Filed July 5, 1923
1,538,354
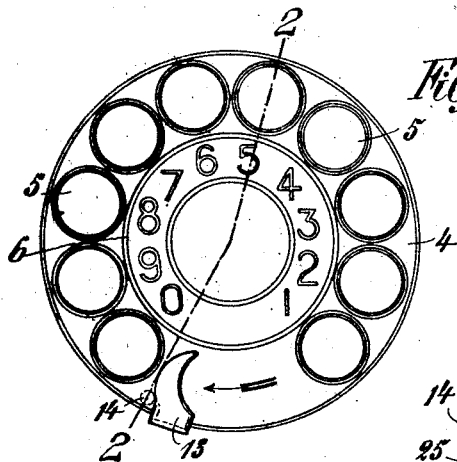

Patented May 19, 1925.

1,538,354

UNITED STATES PATENT OFFICE.

MORTEN BALTHAZAR RICHTER, OF COPENHAGEN, DENMARK.

ELECTRIC-IMPULSE-PRODUCING MECHANISM.

Application filed July 5, 1923. Serial No. 649,539.

*To all whom it may concern:*

Be it known that I, MORTEN BALTHAZAR RICHTER, a subject of the King of Denmark, residing at Amaliegade 7, Copenhagen, Denmark, have invented new and useful Improvements in Electric-Impulse-Producing Mechanisms; and I do hereby declare the following to be a full, clear, and exact description of the same.

The invention relates to an electric impulse producing mechanism adapted for use in automatic telephone exchange systems, and known as dial senders or finger wheels and intended to be mounted on the subscriber's apparatus. The subscriber is hereby able to produce the consecutive series of current impulses necessary to effect the desired connection.

Such apparatus comprises a disc which by means of a finger can be rotated comparatively freely in one direction whereby a spring is tightened while the said disc after having been released is turned backwards by the spring and hereby causes a set of contact springs to make and break a contact thereby producing one or more current impulses. As the impulses must follow each other with regular intervals of time the movement of the disc is controlled by a governor or braking mechanism, generally a centrifugal brake, and it is of importance to the functioning of the apparatus that the said brake and the power transmitting parts, which for practical reasons cannot be lubricated, act invariably and regularly through years and years. In the hitherto known constructions of this kind it has been considered necessary to use a high ratio of gearing between the shaft of the finger disc and that of the centrifugal brake which necessitated a double train of gearing, generally a spur gear and pinion in connection with a worm wheel and worm. Owing to the high number of revolutions of the shaft of the centrifugal brake the dry parts were in a considerable degree subject to wear and tear, and at the same time the high ratio of gearing between the shaft of the finger disc and that of the braking mechanism entailed the drawback that a small variation in the friction between the coacting movable parts had a considerable influence on the braking action which was detrimental to the functioning of the apparatus.

The object of the invention is to provide an apparatus of the kind referred to with a centrifugal brake which for a very long period is able to act regularly without lubrication and does not require a higher speed of revolution than that which can be attained by a simple train of gears which can be accommodated in the restricted space available in the casing of such an apparatus. The apparatus is hereby materially simplified, and as the ratio of gearing is accomplished by a simple spur gear and pinion, the number of movable parts and the possibility of variation in the friction is restricted as far as possible. The braking elements consist of at least three segmental blocks, preferably of metal, which are carried round in a cylindrical casing of ebonite or a similar material against the inner cylindrical wall of which the said blocks are pressed by centrifugal force.

An embodiment of the invention is shown in the annexed drawing in which:

Figure 1 shows a top view of the apparatus,

Figure 2 a sectional view taken along the line 2—2 in Figure 1,

Figure 3 a bottom view of the apparatus the casing being removed, and

Figure 4 shows a side view of the cage adapted to accommodate the sector shaped braking elements, Figure 5 shows the cylindrical casing and the cage with the braking elements seen from below, and Figure 6 shows one of the sector shaped braking elements.

In a disc shaped frame 1, Figure 2, is journalled a body by means of rows of balls 2 and 3, which body mainly consists of a finger disc 4 with finger holes 5 and a plate 6 carrying figures from 0 to 9, the disc 4 being provided with a boss or hub 7 carrying a star wheel or impulse wheel 8 which is fixed unturnably on the same. The impulse wheel 8 has ten teeth 9 bent as shown and corresponding to the holes 5 in the finger disc 4. The row of balls 3 is accommodated in grooves in the said impulse wheel and a spur gear 10 which latter has also a groove for a row of balls 11. The finger disc 4 with the thereto fastened impulse wheel are coupled to the gear 10 in such a manner that a relative rotation between the parts can take place if the finger disc is turned rapidly by hand in the direction indicated by the arrow in Figure 1, while the said parts are coupled together when the finger disc is turned in the opposite direction. Such coupling is sometimes effected by means of a pawl and rachet mechanism; in the example shown there has been used for this purpose a helical spring 7' which surrounds the cylindrical part of the hub 7 with a certain friction which is decreased when the said hub is turned in one direction but increases by turning of the hub in the other direction thus effecting the desired coupling. This device works without noise and is not subject to wear and tear when the metal hub is provided with a thin bushing of fibre. This arrangement is well known and does not form part of the invention. Between the finger disc 4 and the fixed frame of the apparatus is inserted a torsion spring 12 of well known kind having a certain initial tension which is further increased when the finger disc is turned in the direction of the arrow and turns the finger disc back when released. A stop 13 of known kind coacts with a stud 14 limiting the backward movement of the finger disc.

The teeth 9 operate an impulse lever 15, Figure 3, which acts upon a set of contact springs 16 for producing current impulses when the impulse wheel 8 is turned backwards by the spring 12, while the lever 15 does not separate the contact springs from each other when the star wheel is turned by hand in the direction indicated by the arrow in Figure 1.

The spur gear 10 meshes with a pinion 17 which is journalled in bushings 18 of fibre or a similar material, and the pinion carries a cage consisting of two circular discs 19 which are connected by a number of pins 20, in the example shown three. Between the discs 19 are inserted three sector shaped metal blocks 21 which are loosely fitting in the cage and are provided with radial slots 22 with which they grip around the pins 20 as shown in Figure 5. The slots 22 are arranged near the leading edges of the blocks 21, i. e. near those edges which are presented forwardly during the impulse-producing movements corresponding to the backward movement of the finger disc 4. The cage with the blocks 21 are accommodated in a fixed hollow drum 23, Figure 2, of ebonite or some similar material, and when the blocks under influence of the centrifugal force are held against and slide upon the inner cylindrical surface of the ebonite drum 23 a friction is created impeding the backward movement of the finger disc and the impulse wheel 8, and this friction has proved to be practically invariable even after a long time and millions of revolutions. The blocks when carried along during the backward movement of the disc 4 by slots and pins near their leading edge and near their circumference have no liability to get jammed and it is shown in practice that the described braking device acts exceedingly constantly and regularly.

In the example shown are used three blocks 21, but their number can be increased by cutting up a cylindrical block into a larger number of sectors.

The apparatus is mounted in a dish shaped casing 24 in which the various contact springs are connected with leaf springs 25 coacting with contact screws 26 with which the various wires leading to the apparatus are connected. This arrangement has the advantage that the apparatus can be removed from the casing 24 for inspection and inserted again without it being necessary to disconnect and reconnect the electrical wires.

Having thus fully described my invention I claim as new and desire to secure by Letters Patent:

In an electric impulse producing mechanism a centrifugal braking mechanism, comprising a cage, three sector shaped blocks having a slot near their leading edge, a pin for each block in the said cage adapted to engage the said slots, and a cylindrical hollow drum adapted to be slidably engaged by the said blocks under influence of centrifugal force.

In testimony whereof I have affixed my signature in presence of two witnesses.

MORTEN BALTHAZAR RICHTER.

Witnesses:
T. HJORSGOORD.
CECIL V. SCHON.